March 8, 1966  B. A. HILLS  3,239,251
JOINT

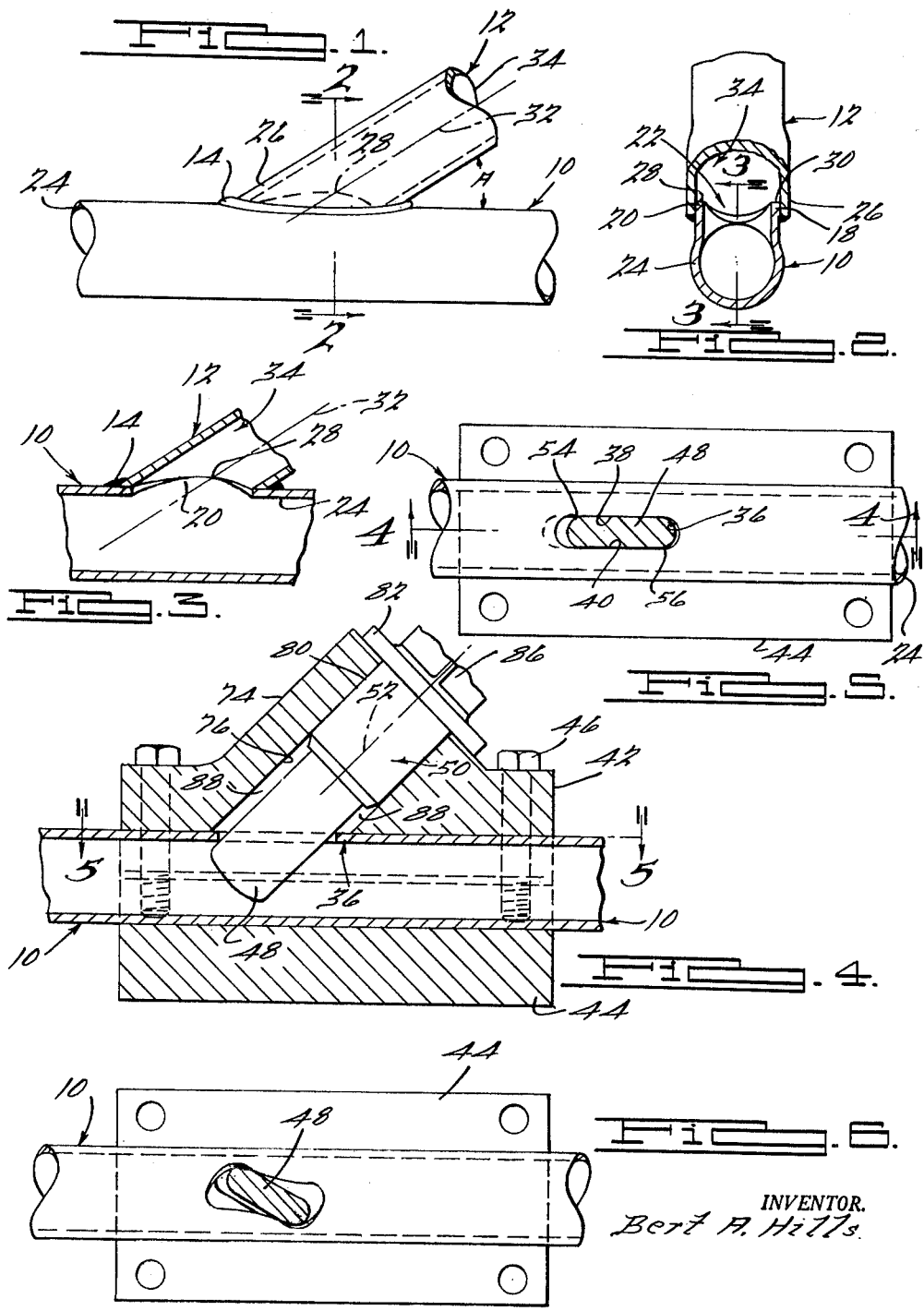

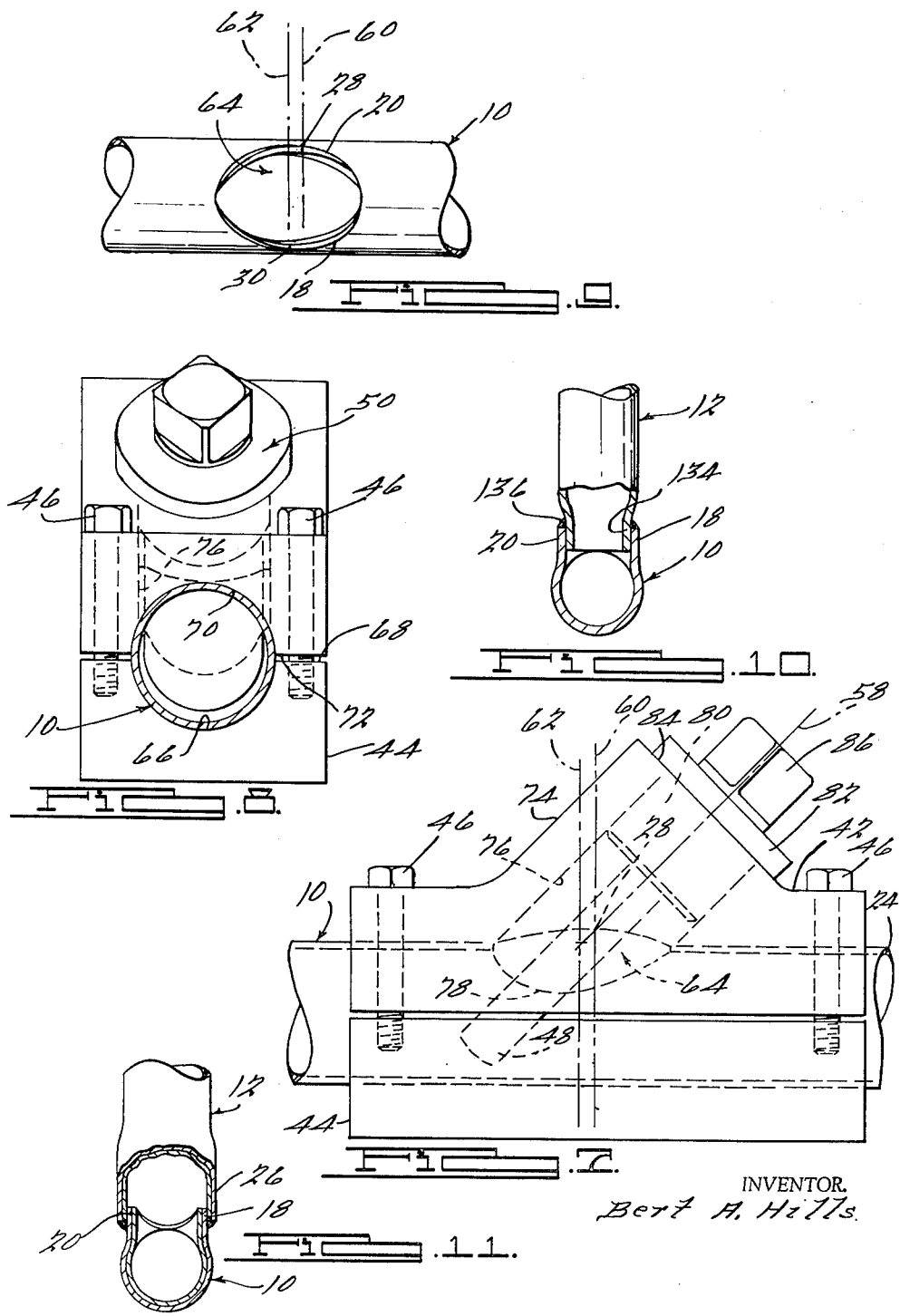

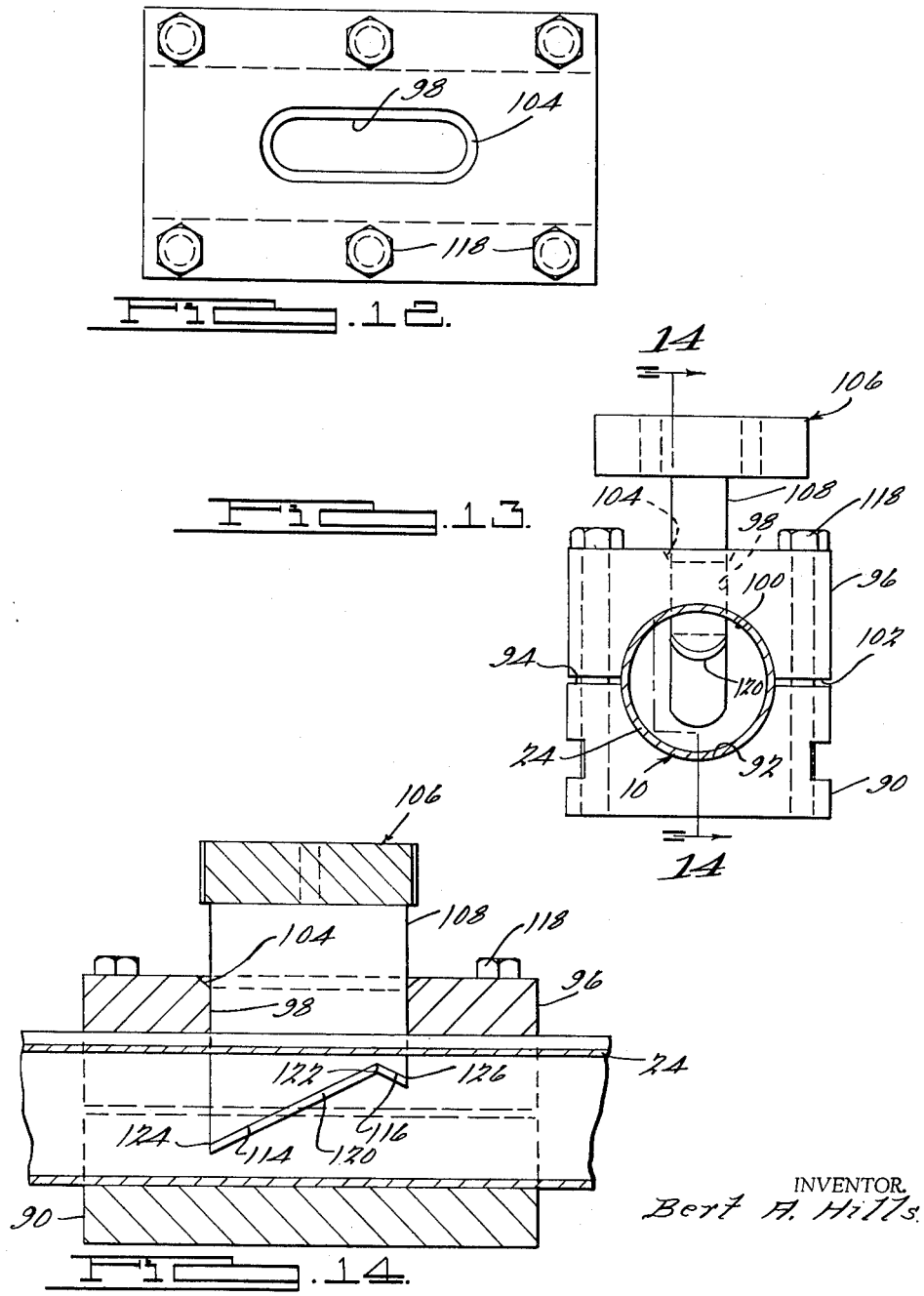

Original Filed Nov. 13, 1961  4 Sheets-Sheet 4

INVENTOR.
Bert A. Hills.

United States Patent Office 3,239,251
Patented Mar. 8, 1966

3,239,251
JOINT
Bert A. Hills, Jackson, Mich., assignor to Walker Manufacturing Company, Racine, Wis., a corporation of Delaware
Original application Nov. 13, 1961, Ser. No. 151,941. Divided and this application Dec. 8, 1964, Ser. No. 416,830
9 Claims. (Cl. 285—189)

This invention is a division of my application Serial Number 151,941, filed November 13, 1961.

This invention generally concerns an improved type of joint between tubular members, and more particularly relates to an improved type of joint between angularly related metal pipe sections of the type used in automotive exhaust systems. The invention further relates to an improved method and apparatus for making the angular joint.

A problem which has existed in industry and in particular in the automotive industry is that of forming strong angular joints betwen pipe sections, particularly of automotive exhaust systems wherein it is necessary to provide the largest possible openings and at the proper angles in the joint leading into the gas passages of the separate pipe sections so as not to create undesirable back pressure and noise. It has been the practice to make joints between main and branch exhaust pipe sections by rather tedius methods wherein the number of cutting and fitting operations involved and the labor and material expense are much greater than desirable. Moreover, current techniques of producing angular joints of comparable strength to applicant's joint between exhaust pipe sections require substantially more welding, brazing or other metallic bonding than is required in applicant's joint. It is also noted that these current techniques by virtue of their relative complexity of operations and apparatus are not readily adaptable for making joints of widely different angularities without involving considerable tooling expense.

In its broad aspects the present invention obviates these problems by providing a main pipe section with flange segments which extend outwardly therefrom and slant in the direction in which the branch pipe section is to be connected to the main pipe section. The branch pipe section is provided with an angularly formed end which engages the flange segments and is thereby positioned on the main pipe section at the proper angle. The flange segments thereby perform several functions such as positioning and locating the branch pipe on the main pipe, providing additional metal in the joint for rigidifying it, and providing for a better weld between the end of the branch pipe and the main pipe, and strengthening the main pipe in the area of the joint.

It is a primary object, therefore, of this invention to provide an economical and structurally improved angular pipe joint which is strong, provides satisfactory gas flow, can be made by minimum of operations and apparatus, and which can readily be made to any desired angularity.

Another object is to provide an angular joint between pipe sections wherein one of the sections is provided with flange means forming part of the joint and providing additional strength thereto.

A further object is to provide a joint between metal pipe sections wherein wall portions of one of the sections are formed outwardly at an acute angle with respect to the longitudinal axis of the one section to provide locating and positioning means for an open end of another pipe section which is to be secured to the one section at an angle with respect to the perpendicular to said one section.

Another object is to provide a method and forming an angular joint between pipe sections of single or laminated construction, wherein the sections are positively located with respect to each other by portions of the joint itself prior to welding, brazing or other metallic bonding of the sections together.

A further object is to provide a method for making an improved angular joint between pipe sections which is adaptable for making or repairing the joint in the field without the need for heavy or cumbersome apparatus.

A further object is to provide improved flanging apparatus for forming angularly extending positioning and securing flanges on one of the pipe sections adapted for engaging an end of another pipe section for positively locating and angularly orienting said pipe sections relative to each other prior to forming a metallic bond between said sections.

A still further object is to provide improved piercing means for forming a slot in the wall of the main pipe section which receives a flaring tool for the formation of the positioning and securing flanges.

Further objects, advantages and novel features will become apparent from the following description and drawings in which:

FIGURE 1 is a side elevation view of a joint between two pipe sections;

FIG. 2 is a sectional view of the joint of FIGURE 1 taken along the line 2—2 thereof;

FIG. 3 is a sectional view of the joint of FIGURE 2 taken along the line 3—3 thereof;

FIG. 4 is a sectional view of the die with the pipe shown in section and with the bending or flaring tool shown in its initial position in the pipe slot with portions of the tool in elevation;

FIG. 5 is a top elevation view of the lower die section with the pipe therein and with the flaring tool in the pipe slot shown in section along a line corresponding to 5—5 of FIGURE 4;

FIG. 6 is a view of the structure of FIGURE 5 with the flaring tool partially rotated clockwise through its flaring angle;

FIG. 7 is a plan view of the die with the flaring tool rotated half way through its flaring angle;

FIG. 8 is a right hand end view of the structure of FIGURE 7;

FIG. 9 is a top view of the main pipe section after the flaring tool has been rotated completely through its flaring angle of 180 degrees;

FIG. 10 is a sectional view corresponding to FIGURE 2 of a modified form of the invention;

FIG. 11 is a sectional view corresponding to FIGURE 2 showing the improved joint between sections of laminated pipe;

FIG. 12 is a top view of the pipe piercing die;

FIG. 13 is an end view of the die of FIGURE 12 with the pipe and piercing punch therein;

FIG. 14 is a sectional view taken along the line 14—14 of FIGURE 13;

Figure 15:
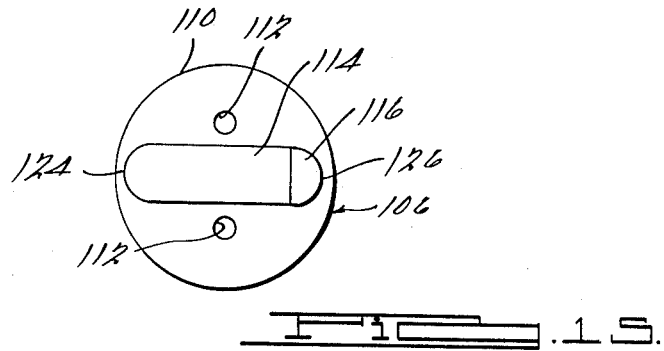
FIG. 15 is a bottom end view of the piercing punch.

Referring to the drawings and in particular to FIGURES 1 through 3, a pair of pipe sections 10 and 12 are shown joined together by welding or brazing or by other metallic bonding means at 14 which is shown to extend all the way around the angularly formed end of the pipe section 12. This joint is formed by providing pipe section 10 with flanges 18 and 20 located on opposite sides of an aperture generally designated 22 extending through the wall 24 of the pipe section 10. The aperture is preferably the same diameter as the inner diameter of conduit 10. These flanges 18 and 20 are seen to nest inside of the end of pipe section 12 which may, if necessary, be radially expanded at 26 by any suitable expanding device such as a drift pin axially forced into the end of the pipe so that said end may readily receive the flanges 18 and 20 without having to be of a larger diameter than pipe 10. It is obvious, however, that pipe section 12 could be of a larger diameter than pipe section 10 which would obviate the necessity for expanding it at 26.

Flanges 18 and 20 are not made with a uniform outer edge radius but are so formed as shown in FIGURES 2 and 3 that high points exist on the flanges 18 and 20 at 28 and 30, respectively, which points are approximately on a diameter D—D of pipe section 12 including both high spots 28 and 30 and the longitudinal axis 32 of the pipe section 12. The reason for providing these high spots 28 and 30 and the non-uniform radius of the flanges is that it is desired to relate the pipe section 12 and the pipe section 10 at an acute angle (A) and the flanges 18 and 20 are therefore formed in a manner hereinafter described to provide arcuate segments of a tubular portion having a longitudinal axis coextensive with axis 32 of pipe 12 and a diameter of such a size that the segments can readily be inserted into the passage or bore 34 of pipe section 12. It is noted that the size of flanges 18 and 20 and end 26 of pipe section 12 can readily be adjusted so that when section 12 is placed over the flanges 18 and 20 it will be properly oriented and frictionally held in place on pipe section 10 for the subsequent welding or brazing operation as at 14 for securing the pipe sections together.

In forming flanges 18 and 20, reference is made to FIGURES 4–9 wherein the pipe section 10 is shown provided with a relatively long aperture or slot 36 in the wall 24 thereof formed in a manner hereinafter described to provide edge portions 38 and 40 in wall 24. Section 10 is then clamped between upper and lower die segments 42 and 44, as shown in FIGURE 4, by bolt means 46 as shown, or by a power press having its ram secured to segment 42, for purposes of rapid mass production. The blade-like end 48 of a tool 50 is then inserted into slot 36 which may be termed as the initial aperture and is then rotated about its longitudinal axis 52 so that edge portions 54 and 56 of the tool will wipe and flare the opposite edge portions 38 and 40 of the wall 24 and form them up into the flanges 18 and 20.

As shown in FIGURES 7 and 8, when tool 50 is rotated so that the widest dimension of blade 48 lies transverse to the slot 36, the plane coexistence with axis 58 of tool 50 intersects the high points 28 and 30 of the flanges along a diameter 60 of pipe 10 which is displaced from the longitudinal center 62 of the initial aperture or slot 36. The widest portion of the final or flared aperture 64 will therefore be offset from the center point 62 to impart an egg shape to the aperture 64. The angular position of blade 48 in slot 36 causes the blade when rotated to impart a slant to each of the flanges 18 and 20 to the right as viewed in FIGURE 9. This slant is such as to correspond to angle (A) at which pipe 12 is to be joined to pipe 10 and allows the flanges 18 and 20 to be axially inserted into the end of pipe 12 with the high portions or points 28 and 30 of the flanges frictionally engaging pipe 12 on a diameter including the longitudinal axis 32 of pipe 12.

As shown in FIGURES 4–8, the flange forming apparatus comprises upper and lower die sections 42 and 44 and flaring tool 50. Lower die section 44 is essentially a block having a groove 66 extending longitudinally in the upper surface 68 thereof. This groove is formed to the proper shape and size to readily accommodate pipe 10. Upper die section 42 is provided with a groove 70 extending longitudinally in the lower surface 72 thereof. A boss 74 projects outwardly at an angle from the top of section 42 and is provided with a bore 76 of a diameter preferably of about the inside diameter of pipe section 10. Bore 76 connects with the groove 70 along the line 78 as shown dotted in FIGURE 7. This particular diameter of bore 76 allows the flanges 18 and 20 to be formed into arcuate segments of a tubular portion having an outside diameter substantially coinciding with the inside diameter of pipe section 12 with the result that little if any flaring of the end section 12 is necessary. The grooves 66 and 70 in these die sections are sufficiently shallow to provide a clearance as shown in FIGURE 8 between die surfaces 68 and 72 so that pipe 10 will be pinched and tightly clamped by the die sections.

The flaring tool 50 is provided with a shank portion 80 which is rotatably mounted in bore 76 and is integrally connected to a flange 82 which slides on a shoulder 84 on boss 74 to properly position the blade-like end 48 of the tool in pipe 10. A nut means 86 or any nut-like shape is also integrally formed with the tool and is adapted for manual or machine rotation by any well known power wrench device. It is particularly noted that the widest portion of blade 48 is substantially less than the diameter of bore 76 as shown in FIGURES 4 and 8 to form a cylindrical die cavity 88 as the blade 48 rotates for receiving and properly shaping the formed up flanges 18 and 20. The tool 50 may be rotated as many times as desired and in any direction desired to form the flanges. The upward arcing of the portions of wall 24 adjacent the edges of slot 36 cause the flanges 18 and 20 to be formed outwardly rather than inwardly as the tool is rotated.

In FIGURE 10 which shows a modifiication of the joint of FIGURES 1–9, the pipe section 10 is provided with the flanges 18 and 20 in the same manner as described above. The pipe section 12, however, is slightly necked down at 134 so as to fit within the flanges 18 and 20. This necking down can be accomplished by any well known method such as by rolling or swaging. A weld or braze 136 may then be used to form a gas-tight bond between pipes 10 and 12. It is noted that it would not be necessary to neck down the end of pipe 12 should it be desired to use a pipe 12 smaller in diameter than pipe 10.

FIGURE 11 of the drawings shows a joint of the type shown in FIGURE 2 wherein pipes 10 and 12 are of a laminated construction. The method of forming this type of joint with the laminated pipe is the same as that shown above in FIGURES 1–8. It is particularly noted that this method of forming a joint with laminated pipe has the inherent advantage of properly positioning the pipe laminations so that the slots 36 therewith will coincide. Moreover, the upturned flange portions 18 and 20 will serve to maintain the lamina in their proper position both longitudinally and angularly with respect to each other after the joint has been welded or brazed. These inherent features are particularly important where the lamina of pipes are loosely assembled and when the weld or braze does not fuse with the flanges of the inner lamination of pipe 10 as shown.

Referring to FIGURES 12–15, the device for forming slot 36 is shown comprising a die and punch assembly. The die comprises a lower die section 90 having a longitudinally extending groove 92 in the upper surface 94 thereof for receiving pipe section 10, and an upper die section 96 having a slot-shaped aperture 98 extending therethrough into a groove 100 in the bottom surface 102 thereof for receiving the top surface of pipe 10. Aperture 98 is chamfered at 104 for providing a lead-in for the piercing tool or punch 106 having a generally oblong-shaped stem 108 and a head 110 which may be provided with bolt-receiving apertures 112 for attachment to the ram of a press or similar power device. The end of stem 108 is formed with a V-shaped angular cut to provide a major cutting edge 114 and a minor cutting edge 116.

Figure 16:
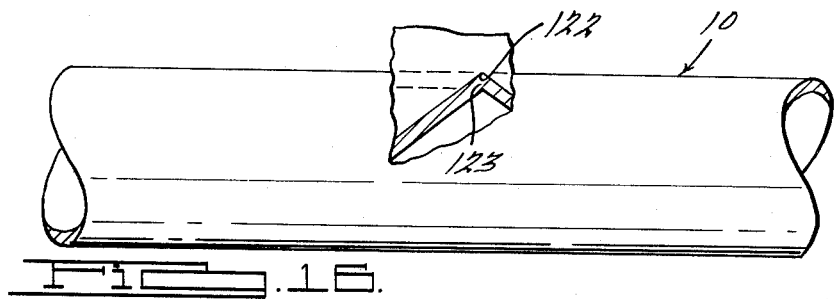
FIG. 16 is a partial longitudinal sectional view of the pipe and the punch in one of its final stages of forming the slot.

In the operation of the slot-forming device the die sections 90 and 96 clamp the pipe 10 by way of clearance provided between the die surfaces 94 and 102. Bolts 118 may be provided for this purpose, or the die section 96 may be attached to a press ram. With pipe 10 securely clamped, the punch 108 is driven into the pipe to cut a slug 120 therefrom. An important consideration in the shape of punch 106 is that the cutting edge thereof, first must pierce wall 24 and then shear it to form a complete slot. As shown in FIGURE 16, the apex 122 of the V-shape cutting edges of punch 106 is not readily adapted to shear the metal as effectively as the other portions of edges 114 and 116 and will cause a piece of metal 123 to momentarily remain in the wall adjacent the apex 122 and spanning the slot 36. As the punch descends further to finally cut the spanning portion 123 loose, the wall portions adjacent either end of portion 123 will tend to collapse in the direction of motion of the punch. Such a collapsing will impair the flaring operation of tool 50 and may result in an inward turning of the flanges 18 and 20.

To avoid this punching problem, applicant locates the piercing point 124 of the major cutting edge substantially below the piercing point 126 of the minor cutting edge so that practically all of the slot will be formed before the spanning piece 123 forms at the apex 122. In this manner, piece 123 is formed so close to one end of the slot that the adjacent pipe wall is sufficiently strong to support the slot edges adjacent the ends of piece 123 during the cutting off thereof and prevent inward collapsing of said edges.

Figure 17:
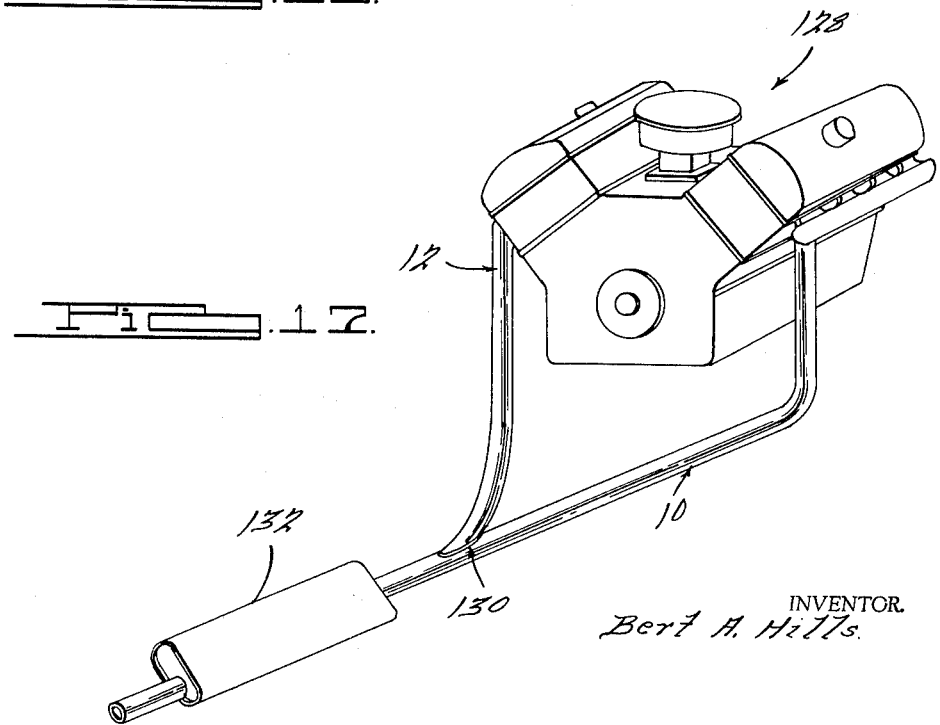
FIG. 17 is an isometric view of pipe sections joined in accordance with the present invention as they may be installed in the exhaust system of an automotive vehicle having an engine with separate banks of cylinders thereon.

An exemplary manner in which the joint may be used in the automotive industry is shown in FIGURE 17 wherein a V-8 engine 128 is provided with the exhaust pipe sections 10 and 12 connected into the separate exhaust manifolds of each of the cylinder heads. It is seen that by providing applicant's joint at 130 it is possible to use exhaust pipe section 10 extending all the way to the muffler 132. Such a joint may thereby eliminate the necessity for providing two separating exhaust pipe sections connected to the exhaust manifolds and joined to a a third pipe which extends to the muffler. The construction of the exhaust pipe system and the method and apparatus for making the same is therefore simplified and the cost of the joint and system is correspondingly reduced. Referring to FIGURES 1 and 17 it is noted that the flow of exhaust gas from right to left in pipe 10 is in the general direction of the flow through pipe 12 and the blending of these two streams is accomplished with a minimum of turbulence, back pressure, and sound.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. In an exhaust system for an internal combustion engine having two exhaust manifolds and pipes leading from each manifold, one of said pipes being provided with an aperture in the wall thereof, said aperture being formed at least in part by a pair of spaced flange segments extending outwardly from said wall, and an end of the other of said pipes engaging said segments to properly position said other section on said one section.

2. In an exhaust system for an internal combustion engine having two exhaust manifolds and pipes leading from each manifold, one of said pipes being provided with an aperture in the wall thereof, said aperture being formed at least in part by a pair of spaced flange segments extending outwardly from said wall and inclined from the perpendicular to said one pipe, and an end of the other of said pipes being angularly formed and engaging said segments so that said other pipe is inclined in substantially the same direction as said tabular portion.

3. An angular joint between two sections of pipe wherein one of said sections is provided with an aperture in the wall thereof, comprising separate flange means on said one section defining at least in part said aperture and forming arcuate segments of a tubular portion extending outwardly from said wall and inclined from the perpendicular to said one section, and an end of the other of said sections engaging said segments so that said other section is inclined in substantially the same drection as said tubular portion.

4. An angular joint between two sections of pipe wherein one of said sections is provided with an aperture in the wall thereof, comprising separate flange means on said one section defining at least in part said aperture and forming arcuate segments of a tubular portion extending outwardly from said wall and inclined from the perpendicular to said one section, and an end of the other of said sections engaging said segments so that said other section is inclined in substantially the same direction as said tubular portion, said sections being secured together by a metallic bond adjacent said end of said other section, and said segments providing rigidifying structure for said joint.

5. An angular joint between two sections of pipe wherein one of said sections is provided with an aperture in the wall thereof, comprising separate flange means on said one section and defining at least in part said aperture and forming segments of a tubular portion extending outwardly at an acute angle from said wall, and an open end of the other of said sections being received inwardly of segments, said open end being formed so that the plane thereof extends generally parallel to said one section while the longitudinal axis of said other section extends from said one section at an acute angle to its longitudinal axis, said axes being those most proximate to the joint.

6. An exhaust system as set forth in claim 1 wherein each of the flange segments has a non-linear edge surface extending away from the axis of the one pipe.

7. An angular joint as set forth in claim 3 wherein the flange means comprise two separate flanges formed on diametrically opposite sides of the aperture, each of said flanges having a non-linear edge surface extending away from the axis of the one pipe section.

8. An exhaust system as set forth in claim 6 wherein the non-linear edge portions are curved and their highest points lie in a common plane that includes the axis of the other pipe.

9. An angular joint as set forth in claim 7 wherein each of the non-linear edges is curved and define high points that lie in a common plane with the axis of the other section.

References Cited by the Examiner

UNITED STATES PATENTS

| | | | |
|---|---|---|---|
| 1,656,736 | 1/1928 | Kellogg | 153—21 |
| 2,101,311 | 12/1937 | Duncan | 285—189 X |
| 2,213,574 | 9/1940 | Weston | 153—21 |
| 2,262,627 | 11/1941 | Whitesell et al. | 285—189 X |
| 2,425,645 | 8/1947 | Ryan | 29—157 |
| 2,511,836 | 6/1950 | Cullen | 29—157 X |
| 2,580,366 | 12/1951 | Smith | 83—686 |
| 2,736,949 | 3/1956 | Kraemer | 29—157 |
| 2,847,069 | 8/1958 | Kopcznski | 83—686 |
| 2,847,819 | 8/1958 | Muller | 60—29 |
| 2,847,820 | 8/1958 | Leach | 60—29 |

SAMUEL LEVINE, *Primary Examiner.*

EDGAR W. GEOGHEGAN, *Examiner*

A. S. ROSEN, *Assistant Examiner.*